May 9, 1950     H. L. KRAUS     2,506,878
TRIPOD ADAPTER
Filed Oct. 21, 1947     2 Sheets-Sheet 1
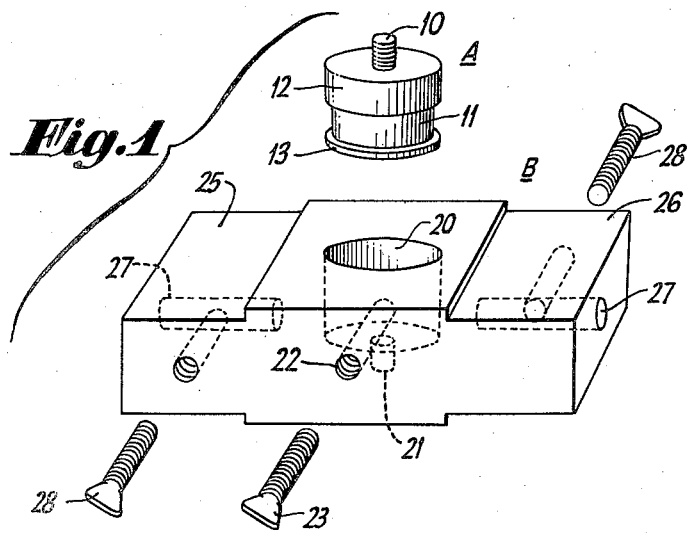
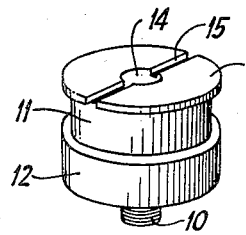
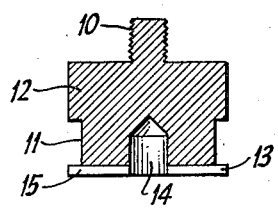
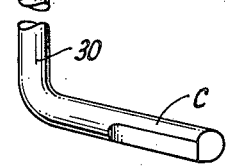
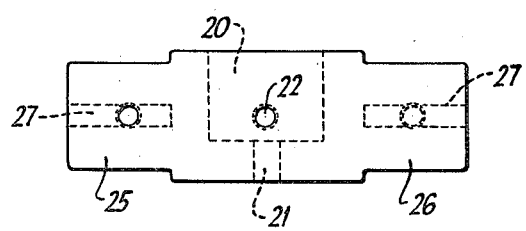
INVENTOR.
HERBERT L. KRAUS
BY Charles H. Brown
ATTORNEY May 9, 1950 H. L. KRAUS 2,506,878
TRIPOD ADAPTER
Filed Oct. 21, 1947 2 Sheets-Sheet 2

INVENTOR
HERBERT L. KRAUS
BY Charles H. Brown
ATTORNEY

Patented May 9, 1950

2,506,878

UNITED STATES PATENT OFFICE 2,506,878

TRIPOD ADAPTER

Herbert L. Kraus, New York, N. Y.

Application October 21, 1947, Serial No. 781,032

5 Claims. (Cl. 248—187)

This invention relates to a tripod adapter for use in mounting a camera upon a tripod.

The conventional camera that is arranged to be supported on a tripod is provided with a threaded hole for accommodating a clamping screw which extends from the tripod head. Among the difficulties experienced with such an arrangement for mounting a camera upon a tripod are: (1) The camera must be properly positioned, so that the screw on the tripoid is in proper relation to the threaded hole on the camera, thus requiring time consuming manipulation, and (2) the camera must be rotated to attach it to and release it from the tripod head, thus requiring additional time consuming manipulation.

These difficulties are overcome by the tripod adapter of the invention which enables the camera to be quickly, easily, and efficiently mounted and dismounted, and locked in any desired angle of adjustment upon the tripod, with a minimum of manipulation, and a minimum of risk to the camera.

Although tripod adapters have been proposed in the past, such proposed adapters suffer from such disadvantages as being complicated in construction, heavy, expensive to manufacture, requiring a relatively large number of parts, and difficult to maintain and operate due to the tendency of such adapters to jam and go out of order.

The tripod adapter of the present invention is an improved construction, which is light in weight, made of a minimum number of parts, easy to use, inexpensive to manufacture, rugged, and one which cannot jam or go out of order.

In brief, the adapter of the present invention comprises a plug or post part for attachment to the camera, and an attaching socket part which can be screwed into the tripod head. The plug is preferably circular in shape, provided on its top surface with a screw for operative association with the threaded hole of the camera, and is provided on its sides with a small cut portion which can be clamped to the attaching socket part. The socket part of the adapter is provided with a cylindrical bore for accommodating the plug, and also with a threaded hole for mounting the adapter on the tripod. A suitable screw, either of the wing nut or knurled type, served to clamp the plug part to the attaching socket part. The socket part of the tripod adapter is also provided with a pair of oppositely disposed extension members for enabling light socket brackets to be secured thereto.

A more detailed description of the invention follows in conjunction with a drawing, wherein:

Fig. 1 shows, in perspective, an exploded view of the parts of the adapter of the invention;

Fig. 1a is a side elevation view of the attaching socket part of the adapter of the invention;

Fig. 2 is a perspective view of the plug part of the adapter, shown bottom side up;

Fig. 3 is a vertical cross-section of the plug;

Figs. 4a and 4b show different types of lighting brackets which can be used with the adapter of the invention;

Figure 5:
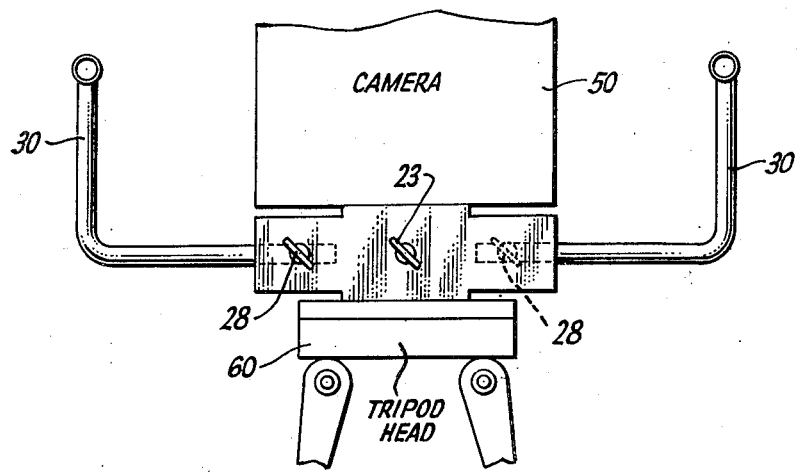
Fig. 5 is a side elevation view of the adapter of the invention mounted on a tripod head and supporting a camera.

Referring to the drawing, the adapter of the invention is shown as comprising a circular plug or post A and an attachment socket B, both made of light weight metal, such as aluminum. The plug A is provided with a screw projection 10 adapted to be inserted into the threaded hole of the camera, not shown. The round side wall of the plug A is cut away or indented at a location 11 intermediate the top and bottom flat surfaces, to thereby form flanges or shoulders 12 and 13. A hole 14 extending up from the bottom of the plug passes part way through the longitudinal center for a purpose to be described later. A coin slot 15 along the bottom accommodates the edge of a coin and enables the plug to be readily removed from the camera in the event the person using the adapter finds difficulty turning the plug with his fingers.

The attachment socket B for accommodating the plug A is provided at its top with a bore 20 into which the plug A can easily slide without too much play, and is also provided at its bottom with a threaded hole or screw socket 21 into which the clamping screw fastened to the tripod head (not shown) can extend. One side of the attachment socket B is provided with a threaded hole 22 communicating with the interior of the bore 20 for accommodating a wing nut or knurled screw 23 for clamping the plug A to the attachment socket B. The hole 22 terminates in the interior of the bore 20 at a location adjacent the cut out portion 11 of the plug A when the plug A is inserted into the attachment socket B, whereby upon tightening wing nut 23, the end of the wing nut will be urged against cut away portion 11 of the plug A and hold the plug A tightly to the part B.

In order to prevent a long tripod clamping screw, which enters the threaded hole 21 at the bottom of attaching socket B, from binding against the base of plug A (when seated in socket B), there is provided the hole 14 at the bottom of plug A. Hole 14 is wider than the tripod screw and registers with the hole 21 when parts A and B are secured together, and enables the top portion of the long tripod screw to enter part way therein without disturbing the seating of the plug A within the socket part B.

Attachment socket B is provided with a pair of oppositely disposed hollow extension members 25 and 26 for accommodating suitable light socket brackets of the type shown in Figs. 4a and 4b. Each extension is provided with a hole 27 for enabling entry of the end of the bracket. The light socket brackets are made from metal rods or tubing 30 or 31, either rigid or flexible, which form a right angle, one end C of which is adapted to extend into a hollow extension member 25 or 26 of the socket B, and the other end D of which is provided with a socket for a light bulb. The extension members 25, 26 are provided with tightening screws 28, such as wing nuts, which enter threaded holes in the sides of these members. These threaded holes in the extension members are located preferably on opposite sides of the socket B, as shown, for clamping the ends of the light brackets C to the extension members 25, 26. It should be noted that the end of the light socket bracket adapted to enter the extension member 25 or 26 is flattened on one side. The purpose of this flattening is to prevent the bracket, due to its weight, from turning in the socket part B against the pressure exerted by the wing nut 28.

The use of similar dimensioned light brackets in both extension members will thus assure symmetrical lighting on both sides of the tripod adapter, assuming, of course, the use of the same size light bulbs in the light brackets.

The light bracket arrangement shown in Fig. 4b enables a bank of lights to be employed on each side of the adapter, and in the same straight line with the extension members. For this purpose, the light bracket of Fig. 4b is provided with an extension accommodating element 35 for enabling a light bracket of the type shown in Fig. 4a (illustrated in dotted lines in Fig. 4b), or of the same type shown in solid lines in Fig. 4b, to be positioned end-to-end in the same plane.

In using the adapter of the invention, the plug A is tightly secured to the camera by screwing the threaded stud 10 into the screw socket of the camera. The attaching socket part B is tightly secured to the tripod head by screwing the clamping screw of the tripod into the threaded hole 21. Whenever it is desired to mount the camera upon the tripod, it is only necessary to place the camera together with its attached plug A over the top of the part B and permit the plug A to fall into bore 20. The circular shape of the plug A enables the camera together with the plug to be turned to any angle of adjustment having a 90 degree relation to the axis of the lens, over a range of 360 degrees. By tightening screw 23, the two parts A and B will be firmly held together as a unit. For dismounting the camera, it is only necessary to loosen screw 23 and lift the plug (to which the camera is attached) out of the socket part B. It will thus be seen that the camera can be quickly mounted and dismounted with relative ease and a minimum of manipulation.

Fig. 5 shows the adapter of the invention mounted on a tripod head 60 and rigidly supporting a camera 50. The light brackets 30 are shown secured to both extension members of the socket part.

Figure 6:
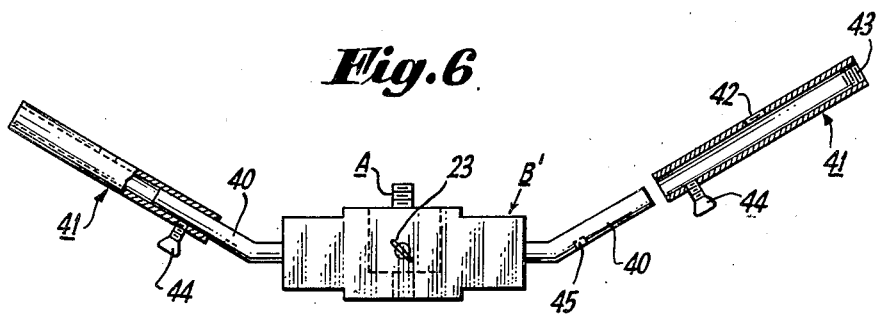
Fig. 6 shows a side view of another embodiment of the invention.

Fig. 6 illustrates a modification of the adapter of the invention which differs from the adapter of Fig. 1 in the construction of the extension members of the socket part. This socket part in Fig. 6 is designated B' and includes a pair of bent metal rods 40, 40 forming an integral part of and oppositely disposed with respect to the extension members. The rods 40, 40 are designed to support metallic, tubular, light bulb receiving brackets 41, 41 which are threaded at 42 and 43 for receiving suitable light socket attachments. A wing nut 44 is used to firmly secure the tubular brackets to the rods. For this purpose there is provided a hole 45 in each bent rod 40 or 41 into which the end of the wing nut 44 can extend.

Although the attaching socket parts B and B' have been shown as being rectangular in shape, it should be understood that this showing is only by way of illustration and not by limitation, and that any polygonal shape may be employed, such as a hexagon or an octagon with a single pair of oppositely disposed extension members. If desired, the extension members for holding the light socket brackets may be eliminated from the adapter of the invention without departing from the spirit and scope of the invention as defined in the appended claims.

What is claimed is:

1. A tripod adapter comprising a round plug having a top screw for insertion into a camera, and a socket having a cylindrical bore for accommodating said plug, said plug having a circular cut out or indented portion located between the top and bottom surfaces of said plug, said socket having a threaded hole passing completely through one side wall and communicating with said bore, and a screw for insertion into said threaded hole for clamping said plug to said socket, the location of said hole being such that said screw exerts pressure against the cut out portion of said plug when said plug is seated in said socket, said socket having a pair of extension members for supporting light bulb brackets, said extension members being symmetrically disposed on opposite sides of said socket and having horizontally positioned holes arranged in the same straight line for mounting said brackets.

2. A tripod adapter comprising a round plug having a top screw for insertion into a camera, and a socket having a cylindrical bore for accommodating said plug, said plug having a circular cut out or indented portion located between the top and bottom surfaces of said plug, said socket having a threaded hole passing completely through one side wall and communicating with said bore, and a screw for insertion into said threaded hole for clamping said plug to said socket, the location of said hole being such that said screw exerts pressure against the cut out portion of said plug when said plug is seated in said socket, said socket having a pair of extension members for supporting light bulb brackets, said extension members being symmetrically disposed on opposite sides of said socket and having horizontally positioned holes arranged in the same straight line for mounting said brackets, means on one side of one extension member, and means on the opposite sides of the other extension member for securing said brackets to said extension members, said socket having a bottom threaded hole for accommodating the clamping screw of a tripod.

3. A tripod adapter comprising a round plug having a top screw for insertion into a camera, and a socket having a cylindrical bore for accommodating said plug, said plug having a circular cut out or indented portion located between the top and bottom surfaces of said plug, said socket having a threaded hole passing completely through one side wall and communicating with said bore, and a screw for insertion into said threaded hole for clamping said plug to said socket, the location of said hole being such that said screw exerts pressure against the cut out portion of said plug when said plug is seated in said socket, said socket having a pair of extension members for supporting light bulb brackets, said extension members being symmetrically disposed on opposite sides of said socket.

4. A tripod adapter comprising a round plug having a top screw for insertion into a camera, and a socket having a cylindrical bore for accommodating said plug, said plug having a circular cut out or indented portion located between the top and bottom surfaces of said plug, said socket having a threaded hole passing completely through one side wall and communicating with said bore, and a screw for insertion into said threaded hole for clamping said plug to said socket, the location of said hole being such that said screw exerts pressure against the cut out portion of said plug when said plug is seated in said socket, said socket having a pair of extension members symmetrically disposed on opposite sides of said socket, and rods integrally connected to said extension members and extending in opposite directions for supporting light bulb brackets.

5. A tripod adapter comprising a round plug having a top screw for insertion into a camera, and a socket having a cylindrical bore for accommodating said plug, said plug having a circular cut out or indented portion located between the top and bottom surfaces of said plug, said socket having a threaded hole passing completely through one side wall and communicating with said bore, and a screw for insertion into said threaded hole for clamping said plug to said socket, the location of said hole being such that said screw exerts pressure against the cut out portion of said plug when said plug is seated in said socket, said socket having a pair of extension members adapted to be secured thereto, said extension members comprising metallic rods each having one end of such size as to slide into an opening in said socket and an opposite end provided with a light bulb bracket.

HERBERT L. KRAUS.

REFERENCES CITED

The following references are of record in the file of this patent:

UNITED STATES PATENTS

| Number | Name | Date |
|---|---|---|
| 399,345 | Poehlman | Mar. 12, 1889 |
| 1,854,951 | Neuwirth | Apr. 19, 1932 |
| 2,318,633 | Ries | May 11, 1943 |

FOREIGN PATENTS

| Number | Country | Date |
|---|---|---|
| 470,177 | France | June 9, 1914 |